E. McCOY.
LOCOMOTIVE LUBRICATOR.
APPLICATION FILED AUG. 14, 1911.
1,097,134.
Patented May 19, 1914.
2 SHEETS—SHEET 1.
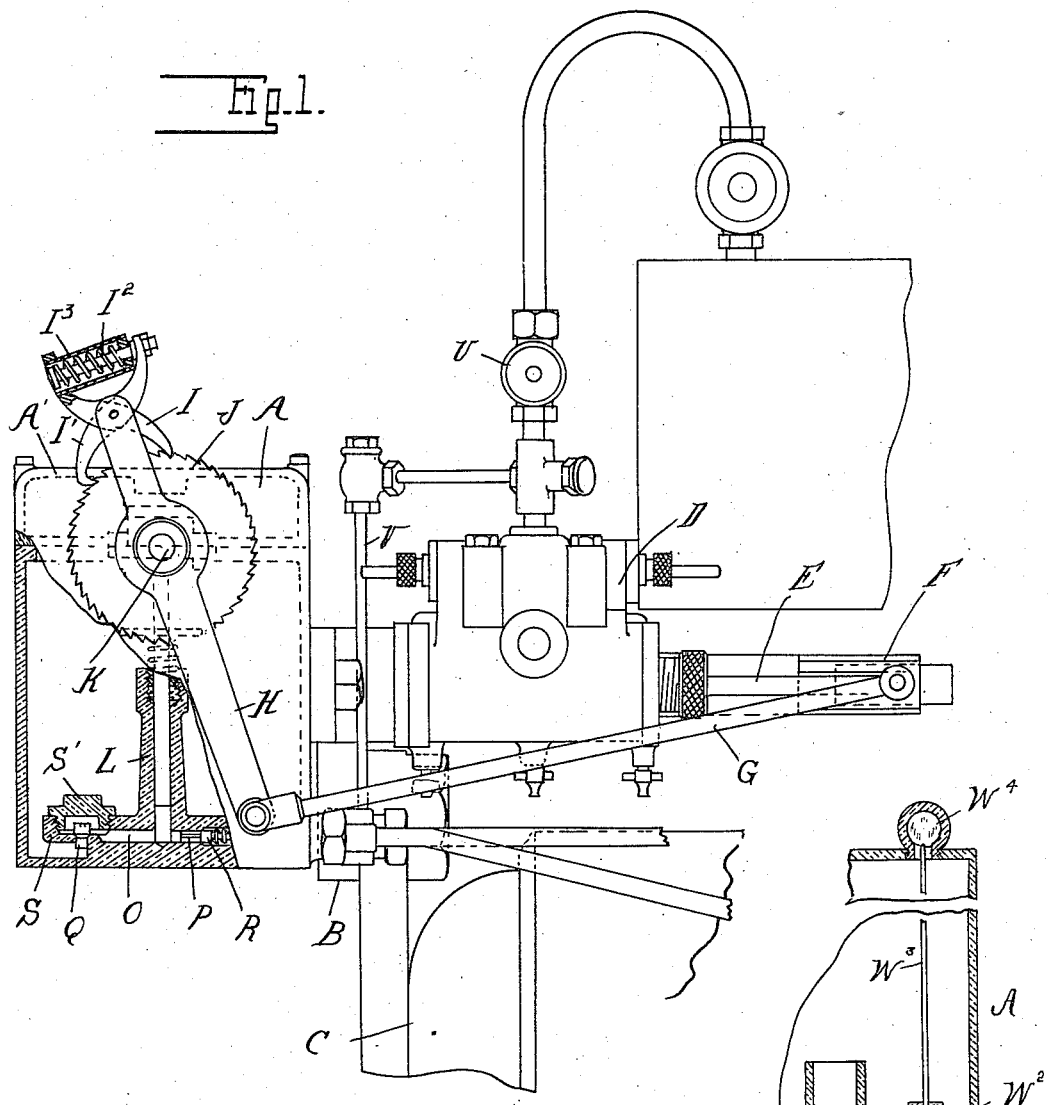
Witnesses
Inventor
Elijah McCoy
By Whittemore Hulbert & Whittemore
Attys E. McCOY.
LOCOMOTIVE LUBRICATOR.
APPLICATION FILED AUG. 14, 1911.

1,097,134.

Patented May 19, 1914.
2 SHEETS—SHEET 2.

Witnesses
W. K. Ford
J. B. Belknap

Inventor
Elijah McCoy
By Whittemore Hulbert & Whittemore
Atty's

UNITED STATES PATENT OFFICE.

ELIJAH McCOY, OF DETROIT, MICHIGAN, ASSIGNOR OF FORTY-EIGHT ONE-HUNDREDTHS TO J. L. JOHNSON, OF NORTHVILLE, MICHIGAN.

LOCOMOTIVE-LUBRICATOR.

1,097,134.   Specification of Letters Patent.   Patented May 19, 1914.

Application filed August 14, 1911. Serial No. 643,952.

*To all whom it may concern:*

Be it known that I, ELIJAH McCOY, a citizen of the United States of America, residing at Detroit, in the county of Wayne and State of Michigan, have invented certain new and useful Improvements in Locomotive-Lubricators, of which the following is a specification, reference being had therein to the accompanying drawings.

The invention relates to lubricators, and is more particularly designed for use in connection with locomotives.

It is the object of the invention to obtain a simple construction of mechanism, which will provide for the independent lubrication of the two piston cylinders, air brake, etc., and in which each separate lubricator may be independently adjusted.

With these and other objects in view, the invention consists in the construction as hereinafter set forth.

Figure 4:
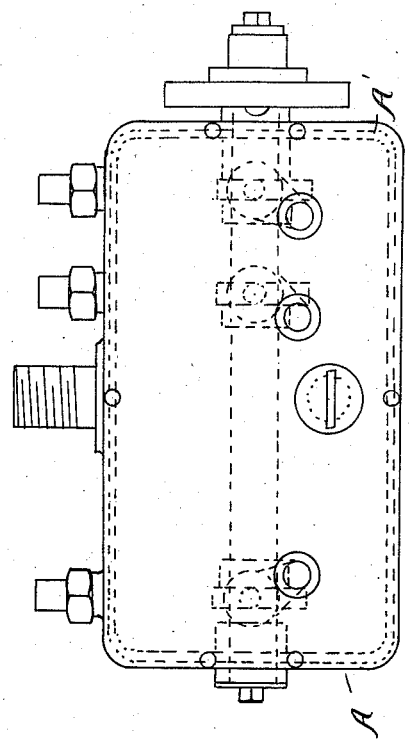
Figure 3:
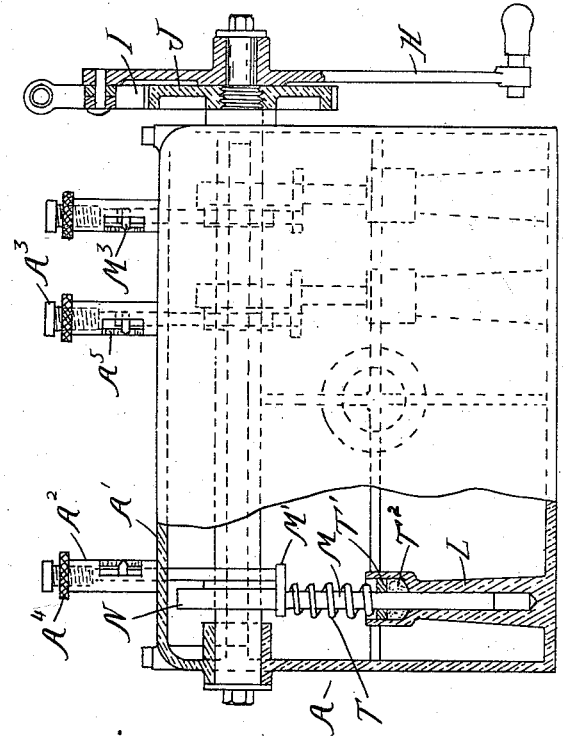
Figure 2:
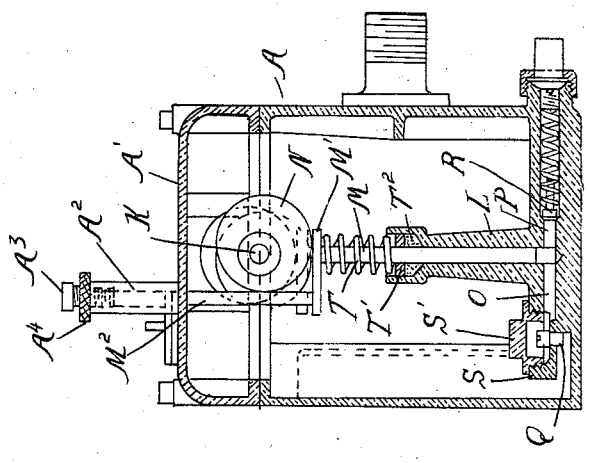

In the drawings,—Figure 1 is a side elevation, partly in section, of the lubricator as applied to a locomotive; Fig. 2 is a cross section through the lubricator; Fig. 3 is a longitudinal cross section thereof; Fig. 4 is a plan; and Fig. 5 is a section similar to Fig. 2 showing a modification.

It is one of the objects of the invention to obtain a positive mechanical feed for the lubricant which may be accurately regulated and proportioned and which is operated whether the locomotive is running or stationary. Inasmuch as there is no constantly-driven mechanism upon locomotives, my construction comprises, in association with the lubricating means, a steam-actuated motor.

As shown, A is the tank or receptacle for the lubricant, which is preferably supported on a bracket arm B secured in any convenient location, such as to the boiler head C. Upon this same bracket arm B is mounted a small motor D, preferably of the reciprocating piston type. The piston rod E of the motor is connected to a cross head F, which in turn is connected by a rod G with an oscillatory ratchet arm H having pawls I for communicating motion to a ratchet wheel J. This wheel is mounted upon a shaft K extending longitudinally through the tank A and which actuates the feed mechanism for the lubricant.

The operating parts of the lubricator, with the exception of those already described, are preferably all arranged within the tank A. This insures the constant lubrication of this mechanism by the oil within the tank, and also forms a protecting housing therefor.

I preferably provide three independent lubricant pumps, each comprising a cylinder L, a plunger M therein, and a cam N on the shaft K for actuating the plunger. The cylinders L are preferably integral with the lower section of the tank A, and are in the form of upwardly extending lugs therein, which are bored vertically to form the pump barrel. At the base of these lugs are laterally extending bored or cored passages O P communicating with the pump barrel and forming respectively inlet and outlet connections therefor. Check-valves Q R are arranged in the respective passages, the former being preferably vertically arranged and seated by gravity. As shown, the valve Q is arranged in a chamber formed in an overhanging lug S, said chamber being closed by a detachable screw-cap S'. This permits of boring the port for the valve and forming its seat by a vertically-extending tool.

The plunger M is preferably formed integral with a laterally-extending head or cross-head M' which engages the cam N, and an offset shank $M^2$ extends from this cross-head parallel to the plunger M and outward through a bearing in the cap A' of the tank. This bearing is preferably formed by an upwardly-extending lug $A^2$ on said cap, which is bored to receive the shank $M^2$ and which is further provided with an adjustable plug $A^3$ forming a stop for limiting the movement of the shank. This plug preferably has a threaded engagement with the lug, and is locked in various positions of adjustment by a locking nut $A^4$. Thus, by adjusting the plug $A^3$, the length of the stroke of the plunger may be variously limited. An indicator is also preferably provided for the movement of the plunger, this being formed by cutting away the lug $A^2$ at $A^5$ and attaching to the shank $M^2$ an index finger $M^3$, which travels in proximity to a suitable indicator scale.

The cam N in engagement with the cross-head M' is single-acting and propels the plunger M on the down stroke. To return the plunger, a spring T is preferably sleeved thereon between the cylinder L and the crosshead M' and which operates to maintain said head at all times in contact with the cam N. The spring T is also employed for the further function of packing the plunger in the cylinder, and to this end a suitable packing gland T' is arranged at the upper end of the cylinder, against which the lower end of the spring abuts and which bears against the packing material T².

With the construction as thus far described, in operation, whenever rotary motion is imparted to the shaft K this will cause the cams N to reciprocate the plungers M, while the springs T operate upon said plungers in the return stroke. With each upward stroke of the plungers M, the lubricant is drawn in past the check-valve Q and through the ports O into the pump barrels. In the down stroke of the plunger, the valve Q closes and the lubricant is expelled through the passage P and past the check-valve R. This will produce a positive feeding of the oil, and the amount of the feed can be varied by adjusting the plugs or stops A³ which limit the upward movement of the plungers.

The motor D may be controlled by a suitable throttle valve U, which may be adjusted to obtain the required speed of operation. This motor may be of any suitable construction forming no part of the present invention, and the valve and piston may be lubricated by a branch connection V with one of the tallow pipes or lubricant conduits, preferably that one which extends to the air-brake motor.

To insure positiveness in operation, the ratchet lever H is preferably provided with double pawls I I' having respectively a push and pull engagement with the ratchet teeth and which are yieldingly held in engagement therewith by a spring I² housed in a suitable case I³.

To provide a sight-feed for the lubricant I preferably employ the arrangement shown in Fig. 5 in which the outlet conduit P has connected thereto, an upwardly extending passage W containing a check valve W'. As shown, this check valve is arranged in an upwardly extending lug W² formed integral with the casing, and from the upper end of this lug a conduit W³ extends upward to the top of the case. Here it extends into a sight-feed W⁴ through which the feeding of the oil may be observed. This conduit is so restricted that but a small portion of the oil passing into the outlet passage P is fed therethrough but it nevertheless, forms a sure indicator that the pump is operating. This sight-feed performs the further function of a relief which prevents the pump from becoming air bound and avoids the necessity of providing air relief cocks. Furthermore, as the sight-feed fitting W⁴ is in constant communication with the tank the oil fed therein will be returned and an equal pressure will be maintained in the tank and sight-feed.

What I claim as my invention is,—

1. In a lubricator, the combination with a tank or receptacle for the lubricant, of a pump cylinder therein, a plunger engaging said cylinder having a laterally extending head or offset, and a shank extending upward from said offset portion and movable therewith, a bearing in the top of said tank with which said shank is engaged, an adjustable stop for said shank in said bearing, an index on said shank, and a cam engaging said offset portion for operating said plunger.

2. In a lubricator, the combination with a tank or receptacle for the lubricant, of a pump cylinder therein, a plunger engaging said cylinder, a shank movable with said plunger, said shank extending upward through the top of said tank, a bearing in the top of said tank with which said shank is engaged, a cam, said plunger having a portion engageable with said cam, and an adjustable stop for said shank in said bearing for limiting the upward movement of said plunger.

3. In a lubricator, the combination with a tank or receptacle for the lubricant, of a pump cylinder therein, a plunger engaging said cylinder, means for positively operating said plunger in its downward stroke, spring-pressed means for returning said plunger on the upward stroke, a shank movable with said plunger having a portion projecting through the top of said shank, an adjustable stop engaging a portion of said shank exterior to said tank to limit the movement of said plunger by said spring-pressed means, and indexing means for determining the amount of upward movement of said shank.

In testimony whereof I affix my signature in presence of two witnesses.

ELIJAH McCOY.

Witnesses:
JAMES P. BARRY,
W. J. BELKNAP.